United States Patent [19]

Botman et al.

[11] Patent Number: 5,087,599
[45] Date of Patent: Feb. 11, 1992

[54] NICKEL/SILICA CATALYSTS AND THEIR PREPARATION

[75] Inventors: Martha J. P. Botman, Berkel en Rodenrijs; Peter Nootenboom, Oud-Beyerland; Johannes C. Oudejans, Zevenaar; Dirk Verzijl, Barendrecht, all of Netherlands

[73] Assignee: Unilever Patent Holdings B.V., Rotterdam, Netherlands

[21] Appl. No.: 287,226

[22] Filed: Dec. 21, 1988

[30] Foreign Application Priority Data

Dec. 21, 1987 [EP] European Pat. Off. ........ 87202585.3

[51] Int. Cl.$^5$ .............................................. B01J 21/08
[52] U.S. Cl. ..................................... 502/252; 502/259
[58] Field of Search ..................... 502/259, 234, 252

[56] References Cited

U.S. PATENT DOCUMENTS

| | | | |
|---|---|---|---|
| 4,591,579 | 5/1986 | Lok et al. | 502/259 |
| 4,631,265 | 12/1986 | Oudejans et al. | 502/259 |
| 4,670,416 | 6/1987 | Klimmek et al. | 502/259 |

FOREIGN PATENT DOCUMENTS

| | | |
|---|---|---|
| 0031472 | 7/1981 | European Pat. Off. |
| 0114704 | 8/1984 | European Pat. Off. |
| 0096289 | 12/1988 | European Pat. Off. |
| 2502142 | 9/1982 | France |

OTHER PUBLICATIONS

Derwent abstracts of the non-English references.

*Primary Examiner*—Carl F. Dees
*Attorney, Agent, or Firm*—Cushman, Darby & Cushman

[57] ABSTRACT

The invention provides a nickel/silica catalyst optionally also containing cations of a lower Group II metal (X), which catalyst satisfies the following combination of features:
1) a molar ratio of $SiO_2/Ni = 0.15-0.35$
2) a molar ratio of $X/Ni = 0-0.15$
3) an active nickel surface area above 120 m$^2$/g
4) a BET surface area of which at least 40% is found with pores with a radius above 2.5 nm. Preferably the catalyst has an atomic X/Ni ratio between 0.05–0.10 and a BET surface area of which at least 45% is found in pores having a pore radius of above 2.5 nm. The group II metal X is preferably magnesium or barium.

4 Claims, No Drawings

NICKEL/SILICA CATALYSTS AND THEIR PREPARATION

The invention relates to nickel/silica catalysts which optionally contain another metal, to a precipitation process for the preparation of such catalysts and to a hydrogenation process using such a catalyst. More in particular the invention relates to a catalyst suitable for the hydrogenation of unsaturated organic compounds, especially fatty acid derivatives.

Nickel/silica catalysts which optionally contain another metal are known from the prior art and mostly they are obtained by coprecipitation methods in which the metal and silica are precipitated simultaneously from a metal salt/waterglass solution by means of an alkaline precipitating agent.

EP-A- 145 094 (Unilever) discloses inter alia nickel/silica catalysts prepared by first precipitating the nickel ions in a first reactor with excess alkaline precipitating agent, allowing the suspended precipitate to mature in a second reactor to which then soluble silicate is added. In the first reactor the average residence time is between 0.1 second and 60 minutes, in the second reactor the average residence time is longer namely between 5 and 180 minutes. The catalysts so obtained have an improved combination of activity and selectivity when compared with the usual coprecipitated catalysts and also the filtrability is improved. Further improvement of the catalytic properties, in particular of selectivity and activity is, however, still desirable.

Also there is EP-A 114 704 (Unilever) which discloses catalysts where the nickel/nickel compound particles are substantially free from silica carrier particles, whereas the present catalyst particles all substantially consist both of nickel/nickel compound and silica.

Finally there is FR-A 2 502 142 (Inst. Francais de Petrole) which relates to nickel catalysts which according to the examples contain 20% of nickel, but according to claim 2 from 0.5-50% of a metal like iron, cobalt or nickel and an additional metal. There is, however, no specific disclosure for catalyst containing more than 20% of nickel.

The present invention now provides an improved, novel nickel/silica catalyst, which optionally also contains cations of a lower Group II metal (X), in which the reduced catalyst satisfies the following combination of features:
1) a molar ratio of $SiO_2/Ni = 0.15-0.35$
2) a molar ratio of $X/Ni = 0-0.15$
3) an active nickel surface area above $120 \, m^2/g$
4) a BET surface area of which at least 40% is found in pores with a radius above 2.5 nm, also the catalyst contains at least 50%, preferably at least 60% of nickel.

It is especially the percentage of the surface in pores with a radius of above 2.5 nm which is important for the activity and selectivity of the catalyst and a percentage of at least 40% is required for good catalytic performance. Preferably this percentage of the surface area is higher than 45%. It would appear that this feature is a more reliable yardstick for catalytic performance than a calculated average pore radius because such a figure ignores the distribution of pore radii.

In a preferred embodiment the novel, reduced catalyst has a $SiO_2/Ni$ molar ratio of 0.15-0.35, further it is preferred that the catalyst has a molar ratio of $X/Ni$ of 0.05-0.15, more preferably between 0.05 and 0.10.

In a further preferred embodiment of the catalyst the lower Group II metal X has an atomic number below 60, more preferable X is a Group IIa metal such as magnesium or it is barium.

The present invention also provides a catalyst in which the active nickel surface area is above $120 \, m^2/g$ nickel. Also generally the catalysts according to the present invention has a pore volume of at least 0.35 ml/g, preferably at least 0.45 ml/g.

As to catalytic properties the present novel catalysts are improved so that the fish oil activity as defined below is more than 150 preferably more than 180% of the activity of the standard catalyst and the selectivity of the catalyst by hydrogenation under standard conditions as defined hereunder leads to melting points of the hydrogenated fish oil below 31.5° C. Also the activity and selectivity with respect to soybean oil have been further improved, namely such that the hydrogenation times under defined test conditions are below 60 minutes and the solid fat contents $N_{30} < 7$ and $N_{35} < 1$. The catalysts according to the present invention can conveniently be prepared by continuously precipitating nickel ions from an aqueous salt solution optionally together with X-ions with an excess alkaline precipitating agent in a agitated reactor with a residence time between 20 and 120 seconds followed by continuous addition of aqueous silicate solution in a second stirred reactor, collecting, drying and reducing of the precipitate in such a way that the residence time of suspension when adding the aqueous silicate solution is between 40 and 300, preferably between 60 and 240 seconds.

As a rule the reactors contain a device for vigorously agitating the liquid and the reactors are of such a dimension with respect to the amounts of liquid pumped in that short average residence times are obtained. One of the distinguishing features from the earlier process therefore is the shorter residence time in the second reactor, which is appreciably shorter so that the throughput of the installation is increased and/or alternatively the second reactor has a smaller capacity. Another distinguishing feature is substantially higher agitation of the contents of the second reactor than in the earlier process. After the second reactor the suspended unreduced catalyst is separated, usually by filtration, but prior to that a storage tank at a lower temperature and which is mildly stirred is sometimes convenient. Also there is the possibility of dosing the silicate to the suspension in more than one reactor, but the total average residence time in this step should remain within the indicated range. The preparation of the catalyst can be carried out batchwise (=discontinuously) or continuously (e.g. according to the cascade method).

Nickel compounds which may be used as starting material for the preparation of the catalyst according to the present invention are watersoluble nickel compounds such as nitrate, sulphate, acetate, chloride or e.g. formate. The solution fed into the first reactor contains between 10 and 80 grams of nickel per liter, particularly preferred are solutions containing between 25 and 60 g metal per liter. The Group II metal compound, in particularly magnesium may be used also as starting material in the form of a watersoluble compound such as a nitrate or chloride. Alkaline precipitation agents which may be used as a starting material for the process of preparation of the catalyst according to the present invention are alkali metal hydroxides, alkali metal carbonates, alkali metal bicarbonates, the corresponding ammonium compounds and mixtures of these compounds. The concentration of the alkaline precipitating agent which is fed in stoichiometric excess into the first reactor is preferably 20 to 300 grams of alkaline material (calculated as anhydrous material) per liter in as far as the solubility permits so, more particularly between 50 and 250 g per liter Preferably precipitation of nickel ions and optionally X-ions with alkaline precipitating agent takes place at a temperature between 20° and 95° C. and the aqueous silicate solution is added at a reactor temperature between 80° and 98° C.

Suitable soluble silicates used in the preparation of the catalysts according to the present invention are alkali silicates, more especially sodium silicate and neutral silicate such as $Na_2O.3SiO_2$ is preferred. The addition of soluble silicate should take place as quickly as possible after precipitation of the metal(s), preferable within 100 seconds.

The amounts and ratios of nickel, Group II metal, soluble silicate and alkaline precipitating agent added to the reactors depend on the desired composition of the eventual catalyst and can be easily calculated.

The catalysts according to the present invention may contain a water insoluble carrier material which was already present during the preparation or was added thereto later. Suitable carrier materials are e.g. silica containing substances like kieselguhr, aluminium trioxide and silicates as bentonite. According to the present invention, however, preferably no insoluble carrier is used. Nevertheless for special applications the presence of an insoluble carrier can be desirable. If carrier material is used, this material can be added (a) direct as such, (b) as an aqueous suspension, (c) preferably as a suspension in the aqueous solution of a metal salt, or (d) as a suspension in an aqueous solution of the alkaline precipitating agent. In a preferred embodiment, in which the precipitation of the metal ions is carried out continuously, the amounts of solutions to be fed into the first reactor are dosed by determining, optionally continuously, the alkalinity (=normality) of the discharged liquid. This can also be done by pH determination (pH 7.0–10). The temperature at which the precipitation of the metal(s) takes place can conveniently be controlled by adjusting the temperatures of the solutions fed in. In any of the two reactors, or in the storage tank prior to filtration, other compounds, if any, may be added such as carrier material, some alkaline solution and/or possible promotors such as copper, zirconium, cobalt, molybdenum, silver possibly other metals or combinations thereof so that their amount in the eventual catalyst does not exceed 10 mole percent of the metal content.

After the silicate addition has been completed the solid components are separated from the mother liquid, washed with water if necessary, e.g. in the presence of a surface active material or organic solvent, e.g. acetone, and subsequently dried by means of spray-drying, freeze-drying and oven-drying. Spray-drying and freeze-drying are preferred because they generally result in better catalytic properties.

Thereafter, if desired, the dry solid material is optionally ground and/or calcined and then activated (or reduced) with hydrogen gas at an increased temperature, which as a rule lies between 300° and 500° C., preferably between 350° and 450° C. The activation can take place at atmospheric or under reduced pressure. The reduced catalyst so obtained is then usually suspended in hydrogenated fatty material, often triglyceride oil.

Another embodiment of the invention provides a method for the hydrogenation of unsaturated organic compounds, in particular fatty compounds such as fatty acids, triglycerides and fatty nitriles by using a nickel/silica catalyst as described above. These hydrogenations are carried out conveniently at increased temperature (80°–250° C.) and optionally increased pressure (0.1–5 MPa) with hydrogen.

The hydrogenated products thus obtained, in particular the hydrogenated triglyceride oils, possess a favourable combination of properties such as low trisaturated content combined with a steep dilatation curve.

EXAMPLE 1

Aqueous solutions of a) the nitrate salts of Ni and Mg (0.6M Ni and 0.06M Mg) and b) $Na_2CO_3$ (10 wt %) were continuously pumped at equal flow rates into a vigorously stirred precipitation reactor during which Ni and Mg precipitated forming a mixed Ni/Mg hydroxycarbonate. The precipitation took place at a temperature of 22° C. and at a pH of 8.8. In the precipitation reactor the suspension had an average residence time of 30 sec. The suspension was continuously transferred into a second, vigorously stirred reactor (energy input 25.5 Watt/liter) in which the average residence time was 72 seconds and the temperature was 95° C. and a pH of 8.8. Simultaneously an amount of silicate ions were dosed into this reactor continuously in the form of waterglass (2% $SiO_2$). The $SiO_2$/Ni molar ratio was 0.21 on an average. The suspension discharged by the second reactor was continuously fed into a large filter storage tank from which the suspension was led to a filter where the precipitate was washed with water of 80° C. to remove $Na^+$ ions. The washed green filter-cake was then dried in a spray dryer at 120° C.

Thereafter the green powder was reduced in a $H_2$ atmosphere for 30 minutes at a temperature of 400° C. to give the active catalyst. The catalyst was characterized by the following chemical and physical methods:

1. The chemical composition expressed as a $SiO_2$/Ni or $(SiO_2+X)$/Ni (molar ratio) was determined by X-ray fluorescence.

2. The active nickel surface area (expressed as $m^2/g$ nickel was determined by $H_2$ chemisorption after reduction of the green cake at 400° C.

3. The catalyst surface area, pore volume and the pore size (distribution) were determined by nitrogen adsorption (Brunauer, Emmett and Teller method, BET). To this end the green cake was reduced at 400° C. and the resulting pyrophoric catalyst was passivated in a 1% $O_2/N_2$ gas mixture at 10° C.

The results of above determinations are given in Table 1.

The catalytic activity and selectivity of the catalyst were determined by hydrogenating two types of edible oil i.e. soybean oil and refined fish oil.

Activity and Selectivity Test (Soya-Bean Oil)

The activity and selectivity of the catalyst were measured by hydrogenating 250 g soyabean oil having an iodine value (IV) of 135 to an IV of 80 using 0.01 (w.w) % Ni with 60 liters $H_2$/hour under a pressure of 0.1 MPa. The temperature in the hydrogenation was gradually increased from 150° C. up to 220° C.

The time required for an IV decrease to 80 is taken as a yardstick for the activity whilst the percentage of solid fat in the hydrogenated soybean oil at different temperatures (30° C., 35° C.), were taken as a measure for the selectivity. These solid fat contents are expressed as $N_{30}$ and $N_{35}$. Low $N_{30}$ and $N_{35}$ values for a hydrogenated soybean oil with IV=80 are indicative for a high selectivity, i.e. low formation of trisaturated glycerides.

Activity and Selectivity test (Fish-Oil)

The selectivity of the catalyst was measured by hydrogenating 250 g fish oil having an iodine value (IV) of 165 to an iodine value of 78 with 0.1 % (w.w.) Ni with 60 liters $H_2$/per hour under a pressure of 0.1 MPa. at 180° C. The hydrogenation time and melting points of the hydrogenated oils were determined.

The activity of the catalyst in the hydrogenation of fish oil $(A_f)$ was determined as follows: 150 g fish oil was hydrogenated at 180° C. at a $H_2$ pressure of 0.1 MPa. Hydrogenation was carried out for 30 minutes. The decrease in the refractive index of the hydrogenated fish oil was determined and compared with the decrease in refractive index of a like hydrogenation with a known standard catalyst and expressed as a percentage. The results are given in Table 1.

EXAMPLE 2

Aqueous solutions of a) the nitrate salts of Ni and Mg (0.6M Ni and 0.06M Mg) and b) $Na_2CO_3$ (10%) were continuously pumped at equal flow rates into a vigorously stirred mechanical input precipitation reactor during which the Ni and Mg precipitated forming a mixed Ni/Mg hydroxycarbonate. The precipitation took place at a temperature of 22° C. and at a pH of 8.8. In the precipitation reactor the suspension had an average residence time of 30 sec. This suspension was continuously transferred to a second, vigorously stirred reactor in which the average residence time was 72 seconds and the temperature was 95° C. and a pH of 8.8. Simultaneously an amount of silicate ions was dosed into this reactor continuously in the form of a 2% $SiO_2$ waterglass solution. The $SiO_2$/Ni molar ratio was 0.21 on an average. The suspension coming from the second reactor was led to a filter storage directly where the precipitate was washed with water of 80° C. to remove $Na^+$ ions. The washed green filtercake was then dried in a spray dryer at 120° C.

Thereafter the green powder was reduced in a $H_2$ atmosphere for 30 minutes at a temperature of 400° C. to give the active catalyst. The catalyst was characterized by the chemical and physical methods mentioned in Example 1.

The catalytic activity and selectivity of the catalyst were determined as described above.

The results of above measurements are given in Table 1.

EXAMPLE 3

Aqueous solutions of $Ni(NO_3)_2.6H_2O$ (0.6M) and soda (10 wt %) were continuously pumped at equal flow rates into a vigorously stirred precipitation reactor, during which nickel hydroxycarbonate precipitated at a temperature of 38° C. The pH of the suspension in this reactor was 8.8. In this precipitation reactor the suspension had an average residence time of 30 seconds. The suspension was continuously led into a second, vigorously stirred reactor in which the average residence time was 85 seconds, the temperature was 92° C. and the pH was 8.8. Simultaneously an amount of silicate ions was dosed into this reactor continuously in the form of waterglass. The $SiO_2$/Ni molar ratio was 0.28 on an average. The suspension coming from the second reactor was led into a large filter storage tank from which the suspension was led to a filter when the precipitated was filtered and washed with water at 80° C. to remove $Na^+$ ions. The washed green filtercake was then dried in a spray dryer at 120° C. Thereafter the green powder was reduced in a $H_2$ atmosphere for 30 minutes at a temperature of 400° C. to yield the active catalysts. The catalyst was characterized by the method as described in example 1 and the results are given in Table 1.

EXAMPLE 4

This example is identical to Example 1 with the exception that magnesium nitrate was replaced by the same molar quantity of barium chloride.

The catalyst was characterized by the methods as described in Example 1 and are given in Table 1.

TABLE I

| Example | 1 | 2 | 3 | 4 |
|---|---|---|---|---|
| $SiO_2$/Ni molar ratio | 0.21 | 0.21 | 0.28 | 0.21 |
| Mg/Ni molar ratio | 0.10 | 0.06 | — | — |
| Ba/Ni molar ratio | — | — | — | 0.11 |
| Nickel percentage w/w | 67.3 | 70.5 | 65.9 | 57.1 |
| Nickel surface area ($m^2$/g Ni) | 141 | 141 | 129 | 121 |
| Catalyst surface area ($m^2$/g catalyst) | 232 | 214 | — | 188 |
| Percentage of catalyst surface area in pores above 2.5 nm | 50 | 47 | — | 51 |
| Pore volume (ml/g catalyst) | 0.48 | 0.38 | — | 0.53 |
| Soya bean oil Hydrogenation test | | | | |
| hydrogenation time (in min) | 52 | | | |
| selectivity | | | | |
| $N_{30}$ (%) | 4.3 | | | |
| $N_{35}$ (%) | 0.1 | | | |
| Fish Oil hydrogenation test | | | | |
| Hydrogenation time (min) | 73 | — | 90 | 83 |
| Selectivity | | | | |
| Melting point oil (°C.) | 29.5 | | 30.0 | 31.5 |
| Fish oil hydrogenation activity $(A_f)$ (%) | 210 | 197 | 154 | 183 |

We claim:
1. A process for preparing a nickel/silica catalyst which optionally contains cations of a lower Group II metal by continuously precipitating nickel ions from an aqueous salt solution optionally together with X-ions with an excess alkaline precipitating agent in a stirred reactor with a residence time between 20 and 120 seconds followed by continuous addition of an aqueous silicate solution in a second reactor, collecting, drying and reducing of the precipitate characterized in that the residence time of suspension when adding the aqueous silicate solution is between 60 and 240 seconds, the resulting catalyst being characterized in that the reduced catalyst satisfies the following combination of features:
  1) a molar ratio of $SiO_2$/Ni=0.15–0.35
  2) a molar ratio of X/Ni=0–0.15
  3) an active nickel surface area above 120 $m^2$/g
  4) a BET surface area of which at least 40% is found with pores with a radius above 2.5 nm and wherein the catalyst also contains at least 50% of nickel, the catalyst being characterized by a pore volume of at least 0.35 ml/g, a selectivity by hydrogenation of soya bean oil leading to an $N_{30}$ and $N_{35}$ below 7 and below 1%, respectively and a selectivity by hydrogenation of fish oil providing a melting point of below 32° C. for the hydrogenated fish oil.

2. A process according to claim 1 characterized in that stirring in the reactors is carried out with an input of mechanical energy of 5-2000 Watt per liter of solution.

3. A process according to claim 1 characterized in that precipitation with alkaline precipitating agent takes place at a temperature between 15° and 95° C.

4. A process according to claim 1, characterized in that the aqueous silicate solution is added at a reactor temperature between 80° and 98° C.

* * * * *